United States Patent [19]
Fullam et al.

[11] Patent Number: 5,802,550
[45] Date of Patent: Sep. 1, 1998

[54] PROCESSOR HAVING AN ADAPTABLE MODE OF INTERFACING WITH A PERIPHERAL STORAGE DEVICE

[75] Inventors: Scott Fullam, Santa Clara; Eric Anderson; Rodger C. Schneider, both of San Jose, all of Calif.

[73] Assignee: Apple Computer, Inc., Cupertino, Calif.

[21] Appl. No.: 587,971

[22] Filed: Jan. 17, 1996

[51] Int. Cl.$^6$ .................................................. G06F 12/00
[52] U.S. Cl. .................................. 711/102; 711/154
[58] Field of Search .......................... 395/497.01, 494, 395/481, 442, 430, 429

[56] References Cited

U.S. PATENT DOCUMENTS

| 5,307,320 | 4/1994 | Farrer | 365/230.01 |
|---|---|---|---|
| 5,343,503 | 8/1994 | Goodrich . | |
| 5,381,538 | 1/1995 | Amini et al. . | |
| 5,386,385 | 1/1995 | Stephens, Jr. . | |
| 5,394,541 | 2/1995 | Chesley | 395/494 |
| 5,457,659 | 10/1995 | Schaefer | 365/222 |
| 5,535,368 | 7/1996 | Ho | 395/497.01 |
| 5,598,540 | 1/1997 | Krueger | 395/284 |
| 5,598,577 | 1/1997 | Overfield | 395/830 |

Primary Examiner—Tod R. Swann
Assistant Examiner—Christopher Chow
Attorney, Agent, or Firm—Burns, Doane, Swecker & Mathis, LLP

[57] ABSTRACT

A processor having an adaptable and self-setting mode of interfacing with a peripheral storage device is provided. The processor comprises a variable-parameter controller which enables the processor to adaptably interface with a peripheral storage device. Upon powering up, the controller first interfaces with the peripheral storage device in accordance with a default mode of operation of the peripheral storage device to extract configuration data from the peripheral storage device. The configuration data relates to at least one alternate mode of operation of the peripheral storage device. The controller then interfaces with the peripheral storage device in accordance with the alternate mode of operation. The processor includes a memory device connected to the variable-parameter controller for storing the configuration data so that it is accessible to the controller.

15 Claims, 3 Drawing Sheets

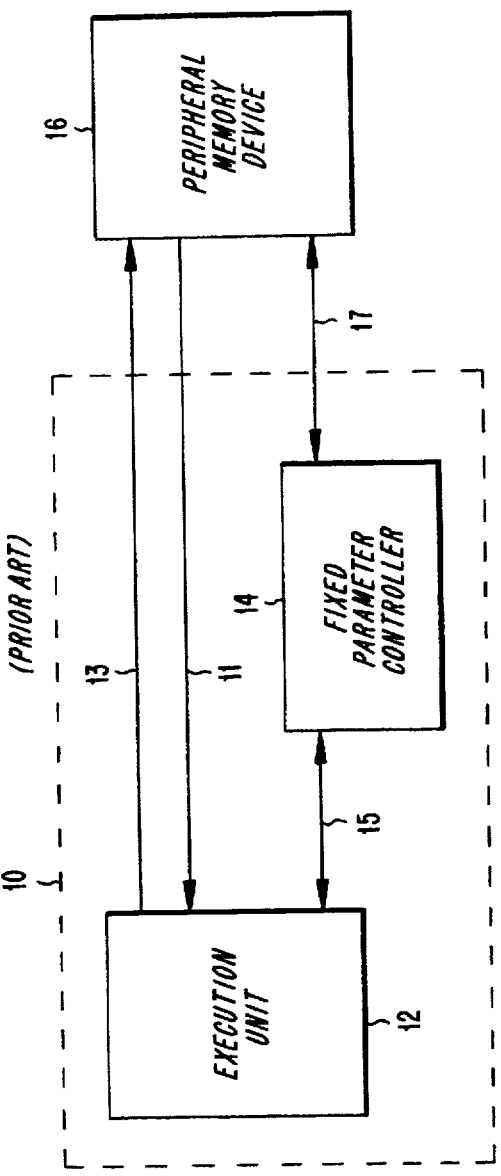
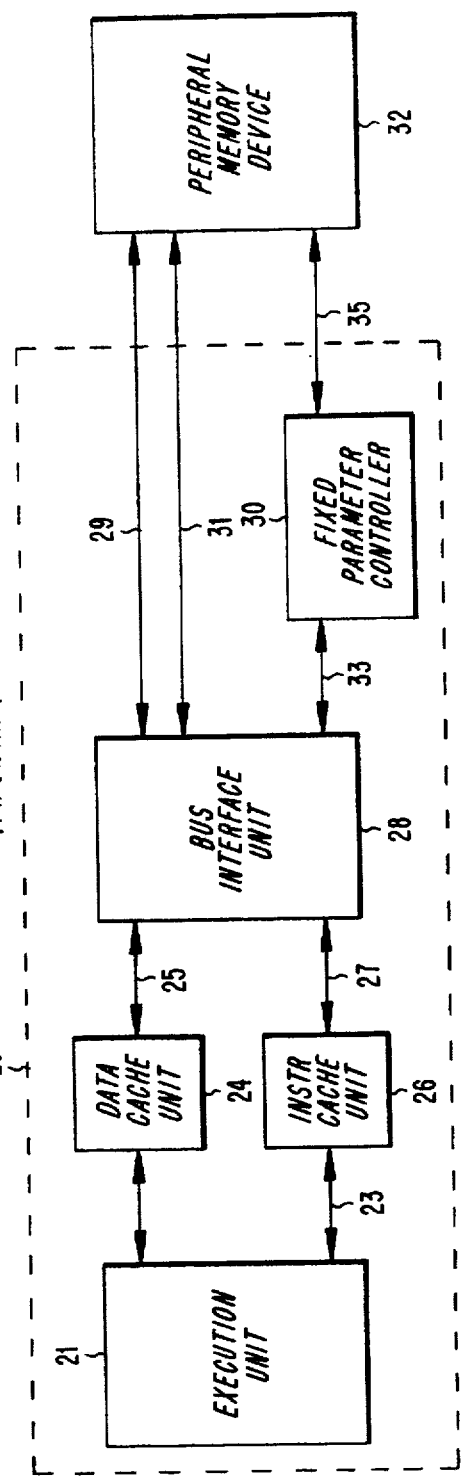

| BIT M | BIT N | BITS O:P | BITS Q:R | BIT S |
|---|---|---|---|---|
| BURST MODE ENABLE | SEQUENTIAL LINE FILLS | FIRST WAIT TIME | BURST WAIT TIME | BURST TYPE |

PROCESSOR HAVING AN ADAPTABLE MODE OF INTERFACING WITH A PERIPHERAL STORAGE DEVICE

BACKGROUND OF THE INVENTION

1. Field of the Invention

The present invention relates to the field of digital processors, and more particularly to the adaptability of general purpose processors for interfacing with different types of peripheral devices.

2. Background of the Related Art

Today, computer system performance is usually limited by the speed at which a digital memory device provides data to a central digital processing unit. This results from the fact that a digital processor can typically execute an instruction much more quickly than a memory device can access and provide data. As a result, a processor often spends time idly waiting for memory input. While system performance can always be improved through use of faster memory devices, the relatively high costs associated with high-speed memories can be prohibitive. Therefore, many system designers have resorted to "cache" memory approaches in order to maximize system performance at minimum additional cost.

In a cache memory system, a central processor makes data and instruction requests to a cache unit situated between the processor and an external memory device. The cache unit is comprised of a relatively small amount of high-speed memory and control logic, while the external device is comprised of a relatively large amount of slower-speed memory. The cache memory is typically some form of very fast random-access memory (RAM). The external memory is often a version of slow-speed RAM, but may also be a form of read-only memory (ROM).

In operation, when the processor makes a data or instruction request, the cache unit looks at the contents of its memory, to see if it contains the requested data. If so, it provides it directly to the processor. If the cache memory does not contain the data, it reads an appropriate block of memory from the external device and provides the processor with the requested information. In that case, memory access is no faster than it would otherwise be in an ordinary non-cache system. Thereafter, however, the cache unit provides data and instructions directly to the processor, if possible, and accesses the external device only when the processor requests information not already residing in the cache unit. In this way, overall system performance is improved through the use of only a small amount of expensive high-speed memory.

While system designers have developed cache approaches to inexpensively increase system speed, memory designers have also been working to increase the speed of their products at low cost. In that regard, several new ROM devices have recently appeared on the market. In particular, "burst-mode" ROM and "nibble-mode" ROM are gaining widespread acceptance among system designers. Each new type of ROM can provide a block of sequentially-addressed data much more quickly than can a standard ROM device, and each new type of ROM is only marginally more expensive than is a standard ROM device. Thus, burst-mode ROM or nibble-mode ROM can be used in combination with cache memory to cost-effectively improve overall system performance.

Because each new type of memory device employs device-specific data formatting and control timing, system designers usually design a processor system with a particular memory device and clock speed in mind. As a result, hardware and software control of external memory devices is typically fixed within a given processor system. This can lead to difficulty should a designer wish to change memory parts or processor speed at a late stage in the design process. A designer might wish to change memory parts when a certain part ceases to be available, when a faster part suddenly becomes available, or when a faster CPU is desired in the system. If a processor system is configured to work only with a certain type of memory part and clock speed, then switching to a new part or changing the clock speed requires a time-consuming and expensive re-design effort. However, if the processor system could be configured to include adjustable memory timing control, then switching to a new memory part or clock speed would require only that the processor be re-adjusted or re-programmed. In the past, processors have been designed to provide user-programmable control of a memory device. For example, U.S. Pat. No. 5,386,385 discloses a processor comprising a mode register storing data relating to certain operations of a synchronous dynamic RAM (SDRAM). Specifically, the user can designate the length of a data burst, and whether the SDRAM is to operate in a serial or interleaved mode. Once the SDRAM is so programmed, it operates in that manner each subsequent time the processor boots up. This approach is designed to work with the specific SDRAM connected to the processor, and is not intended to accommodate different types of memory devices. Thus, there is a need for a method and an apparatus by which a digital processor can automatically adapt to correctly interface with a variety of external memory devices, without requiring user input or system redesign.

SUMMARY OF THE INVENTION

The present invention fulfills the above-described and other needs by providing a processor having an adaptable and self-setting mode of interfacing with a peripheral storage device. The processor comprises a variable-parameter controller which enables the processor to adaptably interface with the peripheral storage device. Upon powering up, the controller first operates in a default mode to obtain configuration data relating to a peripheral storage device. The configuration data could be contained in the peripheral storage device itself, or obtained from another source. The configuration data may relate to an alternate mode of operation of the peripheral storage device, or a change in the clock speed of the processor's system, which affects the timing of processor access to external devices. Upon obtaining this data, the controller can interface with the peripheral storage device in accordance with the alternate mode of operation and/or new timing requirements. There is no requirement that the processor be in a special programming mode. The memory access parameters can be changed at any time. Thus, new and faster components can be employed as they become available, without any significant redesign effort.

The advantages, features, and objects of the present invention are made more apparent by the following detailed description of the present invention when the same is taken in conjunction with the accompanying drawings.

BRIEF DESCRIPTION OF THE DRAWINGS

FIG. 1-a is a block diagram depicting a typical connection between a general purpose digital processor and a peripheral memory device.

FIG. 1-b is a block diagram depicting another connection between a general purpose digital processor and a peripheral memory device.

FIG. 2-b is a timing diagram showing relative timing between a system clock, an address bus, and a data bus, each associated with a nibble-mode ROM device.

FIG. 2-c is a timing diagram showing relative timing between a system clock, an address bus, and a data bus, each associated with a burst-mode ROM device.

DETAILED DESCRIPTION OF THE PREFERRED EMBODIMENTS

Figure 2A:
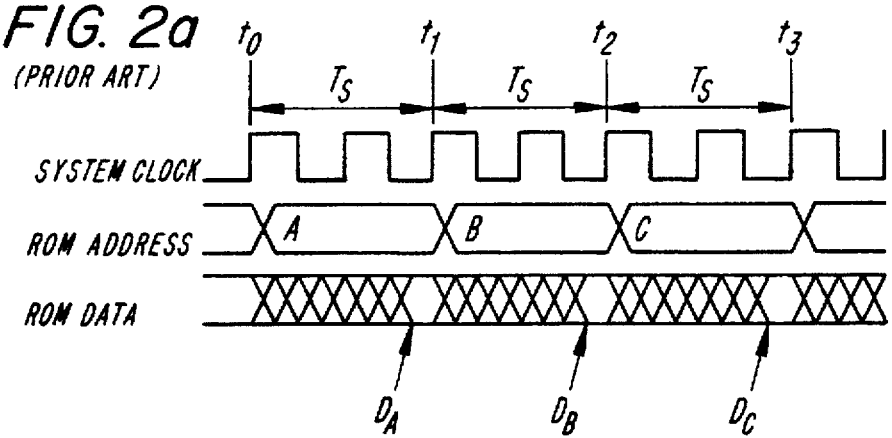
FIG. 2-a is a timing diagram showing relative timing between a system clock, an address bus, and a data bus, each associated with a standard ROM device.

Generally speaking, the present invention comprises a system for permitting a processor to interface with multiple different types of external memory devices, and/or for system clock speed to be changed, without requiring system redesign. To facilitate an understanding of the invention, it is described hereinafter with reference to a specific example in which the processor communicates with different ROM devices. In the implementation of this particular example, data relating to the configuration of the ROM is stored in the ROM itself. It will be appreciated that this particular example is for purposes of illustration, and that other variations of the invention are likewise feasible, as discussed later.

FIG. 1-a represents a simplified connection between a general purpose digital processor 10 and a peripheral memory device 16. In the configuration of FIG. 1-a, the general purpose processor 10 performs various tasks in accordance with data and instruction code stored in the peripheral memory device 16. As shown, the general purpose processor 10 comprises an execution unit 12 and a controller 14. The execution unit 12 obtains data and instructions from the peripheral memory device 16 by means of a data bus 11 and an address bus 13, under the direction of the controller 14. In operation, the execution unit 12 provides a memory address on the address bus 13 and signals the controller 14, via control lines 15, to control the peripheral memory device 16 in such a way that it provides appropriate data or instruction code on the data bus 11.

To control the peripheral memory device 16 correctly, the controller 14 must provide precisely timed control signals on a set of control lines 17 in accordance with timing specifications associated with the peripheral memory device 16. The timing specifications vary depending upon the type of peripheral memory device being used. The peripheral memory device 16 may be any form of random-access memory (e.g., SRAM, DRAM) or any form of read-only memory (e.g., PROM, EEPROM). The controller 14 of Figure 1-a is a "fixed-parameter" controller in the sense that its control circuitry and software are fixed in accordance with the specifications of the particular memory device 16.

FIG. 1-b represents a more detailed version of a generic processor-to-peripheral connection. In FIG. 1-b, a general purpose processor 20 is connected to a peripheral memory device 32. Again, the peripheral memory device 32 may be any form of RAM or ROM. As shown, the general purpose processor 20 comprises an execution unit 22, a data cache unit 24, an instruction cache unit 26, a bus interface unit 28, and a fixed-parameter controller 30. In operation, the execution unit 22 requests data and instruction code from the data cache unit 24 and the instruction cache unit 26, respectively. The execution unit communicates with the data cache unit and the instruction cache unit by means of corresponding interface lines 21,23. If the cache units contain the requested information, they provide it directly to the execution unit. Otherwise, the cache units must access the peripheral memory device 32 in order to obtain the requested information.

To do so, the cache units direct the bus interface unit 28 to fetch the appropriate information from the peripheral memory device 32. The data cache unit 24 and the instruction cache unit 26 communicate with the bus interface unit 28 by means of corresponding interface lines 25,27. To fetch the requested data or instruction code, the bus interface unit 28 provides a memory address to the peripheral memory device 32 via an address bus 31. At the same time, the bus interface unit 28 signals the fixed-parameter controller 30, via control lines 33, to direct the peripheral memory device 32 to provide the appropriate data or instruction code on a data bus 29. Once again, the fixed-parameter controller 30 controls the peripheral memory device 32 by providing precisely timed control signals on a set of control lines 35. After receiving the data or instruction code from the data bus 29, the bus interface unit 28 provides the information to the cache units 24,26 by means of corresponding interface lines 25,27. The cache units 24,26 then provide the requested information to the execution unit 22 by means of other corresponding interface lines 21,23.

Figure 2B:
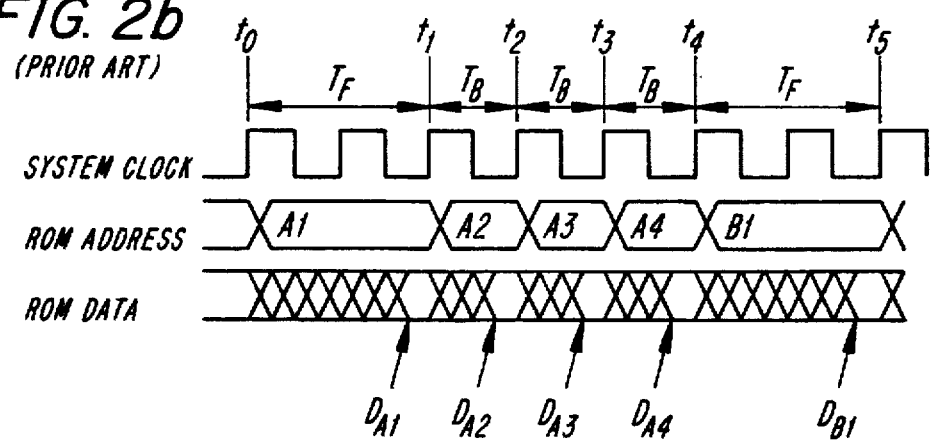
Figure 2C:
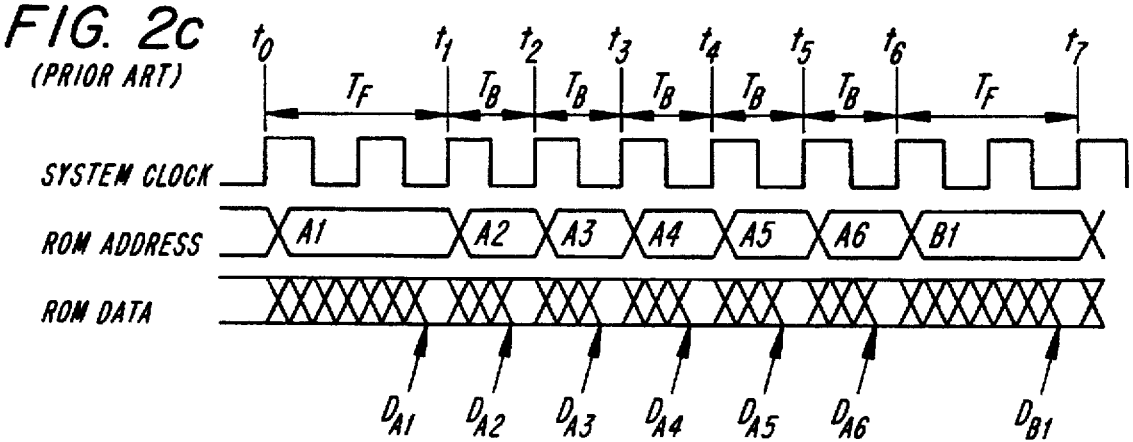

As described previously, the exact nature of the signals sent over the control lines 35 between the controller 30 and the peripheral memory device 32 depends upon the type and model of peripheral memory device 32 being used. For example, if the peripheral memory device 32 is a ROM device, then the precise control signals depend upon whether the device is a standard ROM, a nibble-mode ROM, or a burst-mode ROM. FIG. 2 demonstrates the fundamental differences between these three types of ROM device.

FIG. 2-a represents the relative timing between signals associated with a standard ROM device. Typically, the rising edges of a system clock, such as that shown in FIG. 2-a, is be used to drive the components of a digital processor connected to a standard ROM device. For example, such a system clock is used to drive the execution unit 22 of FIG. 1-b. Note that an execution unit can commonly carry out certain instructions in only one system clock cycle. With respect to FIG. 2-a, it should be understood that a system clock is driving a digital processor connected to a standard ROM device, that the digital processor is providing ROM addresses to the standard ROM device, and that the standard ROM device is providing data to the digital processor when triggered to do so. FIG. 2-a is intended to show the required relative timing between these various signals.

As shown in FIG. 2-a, a valid address A is provided to the standard ROM device at time $t_0$. At the same time, the standard ROM device is triggered, typically via a control line connected to a controller within the digital processor, to provide a data byte which resides at the given memory address A. A fixed period of time after the standard ROM device is triggered, a valid data byte $D_A$ is provided to the digital processor as shown. Once the data byte has been received by the digital processor, the processor can provide another address B and trigger the standard ROM device again. The minimum period of time $T_S$ that must pass between data requests will depend upon the exact standard ROM part being used. In FIG. 2-a, $T_S$ is shown relative to the system clock and is shown to be equal to twice the period of the system clock. In actual practice, $T_S$ might be many times the system clock period. The primary characteristic of interest with respect to the standard ROM device is that, no matter what the address of the requested data, the digital processor must wait a standard amount of time $T_S$ before requesting more data.

FIG. 2-b represents the relative timing between signals associated with a nibble-mode ROM device. As shown, a valid address A1 is provided to the nibble-mode ROM device at time $t_0$. At the same time, the nibble-mode ROM device is triggered to provide a data byte which resides at the given memory address A1. A fixed period of time after the nibble-mode ROM device is triggered, a valid data byte $D_{A1}$ is provided to the digital processor as shown. Once the data byte has been received by the digital processor, the processor can provide another address and trigger the nibble-mode ROM device again. The minimum period of time $T_F$ that must pass before the nibble-mode device can be re-triggered is called the "first wait time" of the nibble-mode device. The length of the period $T_F$ will vary depending upon the exact nibble-mode device being used, and although $T_F$ is shown to be equal to twice the system clock period, it may be longer in actual practice.

The nibble-mode ROM device derives its name from the fact that it accesses data in "nibbles" or "blocks" of more than one byte. As a result, once the first data byte $D_{A1}$ has been provided, data bytes residing in a fixed number of sequential address locations following the first location A1, e.g. A2,A3,A4, can be accessed more quickly. The precise number of bytes per nibble varies in dependence upon the nibble-mode ROM device being used, and some nibble-mode ROM devices are capable of switching between different nibble sizes. For example, one nibble-mode ROM device might be able to provide either a four-byte nibble of sixteen-bit bytes or an eight-byte nibble of eight-bit bytes. Regardless of the number of bytes per nibble, however, the minimum period of time $T_B$ that must pass between sequential data requests within a nibble is much shorter than the initial wait time $T_F$ required at the start of the nibble. $T_B$ is known as the "burst wait time" of the nibble-mode device and varies in dependence upon the exact nibble-mode device being used. As shown in FIG. 2-b, $T_B$ can be one half of $T_F$, but the relationship between $T_B$ and $T_F$ can vary among different models of nibble-mode ROM part. It should be noted that the sequential data bytes $D_{A2},D_{A3},D_{A4}$ can be accessed in any order once the first data byte $D_{A1}$ has been accessed. Also, when the digital processor provides an address B1 that does not fall in the sequentially ordered block following the first address A1, the processor must again wait the first wait time $T_F$ before making additional data requests. Nibble-mode devices can be used to achieve memory access that is faster than that obtainable using standard ROM devices.

FIG. 2-c represents the relative timing between signals associated with a burst-mode, or page-mode, ROM device. As shown, a valid address A1 is provided to the burst-mode ROM device at time $t_0$. At the same time, the burst-mode ROM device is triggered to provide the data byte residing at the given memory address A1. A fixed period of time after the burst-mode ROM device is triggered, a valid data byte $D_{A1}$ is provided to the digital processor as shown. Once the data byte has been received by the digital processor, the processor can provide another address and trigger the burst-mode ROM device again. The minimum period of time $T_F$ that must pass before the burst-mode device can be re-triggered is called the "first wait time" of the burst-mode device. The length of the period $T_F$ varies in dependence upon the exact burst-mode part being used, and although $T_F$ is shown to be equal to twice the system clock period, it may be longer in actual practice.

The burst-mode ROM device derives its name from the fact that it can quickly access sequentially-stored data bytes. As a result, once the first data byte $D_{A1}$ has been provided, data bytes residing in an indefinite number of sequential address locations A2,A3,A4, . . . can be accessed very rapidly. As shown, the minimum period of time $T_B$ that must pass between sequential data requests is much shorter than $T_F$.

As with the nibble-mode devices, $T_B$ is known as the "burst wait time" of the burst-mode device and will vary depending upon the exact burst-mode device being used. It should be noted that the sequential data bytes $D_{A2},D_{A3},D_{A4}, \ldots$ must be accessed in consecutive order once the first data byte $D_{A1}$ has been accessed. Also, when the digital processor provides an address B1 that does not occur in sequential order, the processor must again wait $T_F$ before making additional data requests. Even given these restraints, however, burst-mode parts can be used to achieve memory access speeds that are superior to those of standard and nibble-mode ROM parts.

As discussed previously, a system designer might wish to switch between different types of ROM parts or change the processor speed after the design of a given processor system has been initially established. In the systems of FIGS. 1-a and 1-b, the controllers are fixed-parameter controllers, and consequently switching ROM parts or clock speeds requires that those systems, or at least those controllers, be redesigned. The present invention provides a method and an apparatus by which a processor can automatically interface with different ROM device types, without requiring system redesign. In a preferred embodiment, the invention takes advantage of the fact that all types of ROM devices are capable of operating in a default mode, namely the mode of operation that has been described with respect to standard ROM parts.

Figures 3, 4:
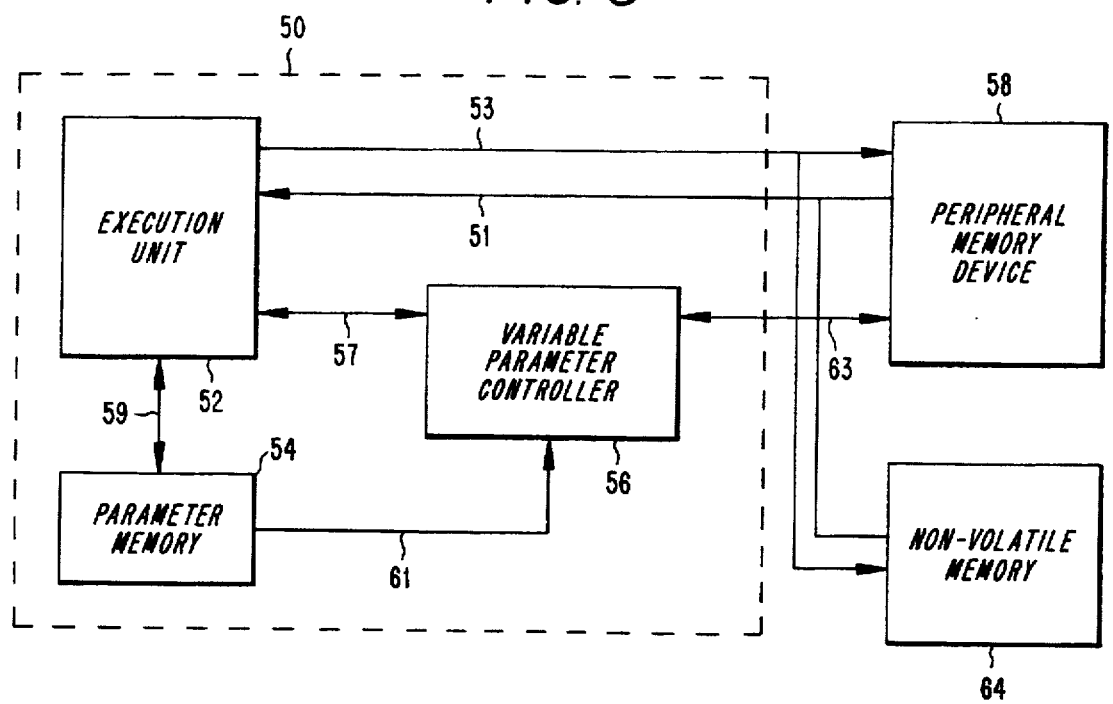
FIG. 3 is a block diagram depicting a connection between a general purpose processor and a peripheral ROM device, in accordance with an embodiment of the present invention.
FIG. 4 depicts exemplary information stored in a parameter memory according to the present invention.

FIG. 3 depicts a general purpose processor 50 and a peripheral memory device 58, such as a ROM, which operate in accordance with the present invention. The general purpose processor 50 performs various tasks in accordance with data and instruction code stored in the peripheral memory device 58. As shown, the general purpose processor 50 comprises an execution unit 52, a variable-parameter controller 56, and a parameter memory 54, such as a register. The execution unit 52 obtains data and instructions from the peripheral memory device 58 by means of an address bus 53 and a data bus 51, under the direction of the controller 56. In operation, the execution unit 52 provides a memory address on the address bus 53 and signals the controller 56, via control lines 57, to control the peripheral memory device 58 in such a way that it provides appropriate data or instruction code on the data bus 51. As described with respect to FIGS. 1-a and 1-b, the precise interface between the execution unit 52 and the peripheral memory device 58 may be more complicated than is shown in FIG. 3. For example, the general purpose processor 50 might include cache units and a bus interface unit as described with respect to FIG. 1-b. It is to be noted that any of the components making up the general purpose processor 50 may be physically separated from one another, or they may be integrated to form one physical device.

The controller 56 must provide precisely timed, and correctly sequenced, control signals on the control lines 63 in accordance with the timing specifications of the particular memory device 58 being used. The memory device 58 might be any of a standard ROM part, a nibble-mode ROM part, or a burst-mode ROM part, for example. To accommodate these different types of parts, the controller 56 is a "variable-parameter" controller, controlling the ROM device 58 in accordance with a set of adjustable parameters stored in the parameter memory 54. The controller 56 receives the stored parameters from the parameter memory 54 via a set of interface lines 61. The contents of the parameter memory 54 are controlled, for example, by the execution unit 52 via programming lines 59.

FIG. 4 exemplifies the type of information stored in the parameter memory 54. For instance, the parameter memory 54 may contain a burst-mode-enable bit M which controls whether the peripheral memory device 58 is operated in a burst mode or in a default, or standard, mode. The parameter memory optionally contains a sequential-line-fill bit N indicating the order in which data is read from the memory, i.e. word formatting in memory. Additionally, the parameter memory 54 contains bits O,P,Q,R defining the number of clock cycles for the first wait time and the burst wait time associated with the memory device 58. A burst type bit S defines whether the memory is operated in a nibble mode or a burst mode. Beyond the bits shown in FIG. 4, the parameter memory 54 can store any information required to correctly control any given type of memory device.

In operation, particularly the case in which the memory device 58 is a ROM, the execution unit is programmed so that, on power up, it may boot from information contained in the ROM. To do so, it reads data from the ROM in the standard, low-speed mode of operation. The contents of the parameter memory 54 may be such that the variable-parameter controller 56 interfaces with the peripheral memory device 58 in standard mode of operation as a default. A data wait time associated with the default mode, analogous to $T_S$ of FIG. 2-a, is sufficiently long that the default mode will work with any type of memory device. As part of the boot process, the execution unit reads configuration data, relating to the peripheral memory device 58, from a non-volatile memory 64. This non-volatile memory might be an EEPROM or flash memory, for example. Once it has extracted the configuration data, the execution unit adjusts the contents of the parameter memory 54 in accordance with the extracted configuration data so that the variable-parameter controller 56 interfaces with the peripheral memory device 58 in a higher-speed, or preferred, mode of operation.

With this arrangement, the present invention permits a digital processor to automatically interface with a variety of external memory devices, and allows changes in the CPU speed to be made, without requiring user input or system redesign. For example, when a new, faster type of ROM device becomes available, it can be substituted for the original ROM. When this is done, the EEPROM 64 is reprogrammed with updated information pertaining to the new ROM device, and all other components of the system remain the same. Similarly, if a new clock is incorporated into the system, the data in the non-volatile memory 64 can be reprogrammed to conform to the new clock speed, e.g. change the number of clock cycles required for the first wait time and burst wait time. The configuration data stored in the non-volatile memory 64 could contain information relating to several possible modes of operation of the peripheral memory device 58. In that case, the general purpose processor 50 stores the data for each of these modes in main memory, and can switch between modes of interface during run-time, if desired, by loading the appropriate data into the parameter memory.

As described in connection with FIG. 3, the configuration data is stored in a separate non-volatile memory 64. Alternatively, the configuration data might be obtained from a different source, for example a hardware element such as jumper pins which are connected in a manner to indicate the memory timing requirements. In another embodiment, this data can be obtained directly from the peripheral storage device 58, by controlling the device according to the default mode of operation. Once the configuration data has been obtained, the controller interfaces with the peripheral storage device in accordance with a preferred mode of operation defined by the configuration data.

Although this detailed description has been developed with respect to ROM devices, the present invention is readily applicable to any non-volatile peripheral storage device, such as a disk drive or other system hardware. Thus, the foregoing detailed description of the present invention is by way of illustration only and is not to be taken by way of limitation, the spirit and scope of the present invention being limited only by the terms of the appended claims.

What is claimed is:

1. A processor having an adaptable mode of interfacing with a peripheral read only memory (ROM) device, wherein said peripheral ROM device is one of a standard-mode ROM device, a nibble-mode ROM device, and a burst-mode ROM device, comprising:

a parameter memory for storing information defining timing and control requirements and at least one data access mode of said peripheral ROM device; and a controller connected to said memory for interfacing with said ROM device in accordance with said stored information.

2. The processor of claim 1, wherein said stored information defines a minimum required first wait time associated with said ROM device.

3. The processor of claim 1, wherein said stored information defines a minimum required burst wait time associated with said ROM device.

4. The processor of claim 1, wherein said stored information defines a data word format associated with said ROM device.

5. The processor of claim 1, further comprising for extracting said information from said ROM device and for storing said information in said parameter memory.

6. The processor of claim 5, wherein said controller interfaces with said ROM device in a default mode of operation to extract said information from said ROM device.

7. The processor of claim 1, further comprising means for extracting said information from a non-volatile memory that is separate from said ROM device and for storing said information in said parameter memory.

8. The processor of claim 7, wherein said non-volatile memory is an EEPROM.

9. A method of interfacing with a peripheral read only memory (ROM) device, wherein said peripheral ROM device is one of a standard-mode ROM device a nibble-mode ROM device, and a burst-mode ROM device, comprising the steps of:

communicating with said ROM device in accordance with a default mode of operation of said ROM device;

obtaining configuration data defining timing and control requirements and at least one mode of data access of said ROM device; and subsequently communicating with said ROM device in accordance with said configuration data.

10. The method of claim 9, wherein the step of obtaining said configuration data is carried out by reading said configuration data from said ROM device while communicating with said ROM device in accordance with said default mode of operation.

11. The method of claim 9, wherein the step of obtaining said configuration data is carried out by reading said configuration data from a non-volatile memory device that is separate from said ROM device.

12. The method of claim 11, wherein the non-volatile memory is an EEPROM.

13. The processor of claim 9, wherein said stored information defines a minimum required first wait time associated with said ROM device.

14. The processor of claim 9, wherein said stored information defines a minimum required burst wait time associated with said ROM device.

15. The processor of claim 9, wherein said stored information defines a data word format associated with said ROM device.

* * * * *